United States Patent [19]
Deering et al.

[11] Patent Number: 4,752,894
[45] Date of Patent: Jun. 21, 1988

[54] COLOR PLOTTER CONTROLLER

[76] Inventors: Michael F. Deering, 541 Del Medio Ave., #132, Mt. View, Calif. 94040; Curt Nehring, 313 Lakeview Way, Redwood City, Calif. 94062; William R. Graves, 43018 Scofield Ct., Fremont, Calif. 94539; David M. Emmett, 3587 La Mata Way, Palo Alto, Calif. 94306; Gus Adriancen, 10136 Alpine Dr., Cupertino, Calif. 95014

[21] Appl. No.: 794,934

[22] Filed: Dec. 30, 1985

[51] Int. Cl.⁴ .......................................... G01D 15/00
[52] U.S. Cl. ................................... 364/520; 346/54
[58] Field of Search ................ 364/518–521; 358/11, 30, 280, 300; 346/154, 157; 400/63

[56] References Cited

U.S. PATENT DOCUMENTS 4,538,232  8/1985  Koyama ........................ 364/518

Primary Examiner—Arthur G. Evans
Attorney, Agent, or Firm—Townsend & Townsend

[57] ABSTRACT

An improved method and apparatus for controlling an electrostatic plotter is disclosed which results in an increased speed for the plotter. This speed is achieved by dividing the picture to be printed into frames and processing the individual frames in parallel with separate controllers for each frame. The styli on the electrostatic printer's head will accordingly be divided into the separate frames. The raster data produced by each of the controllers is combined to form the entire picture and is forwarded to the plotter.

29 Claims, 8 Drawing Sheets

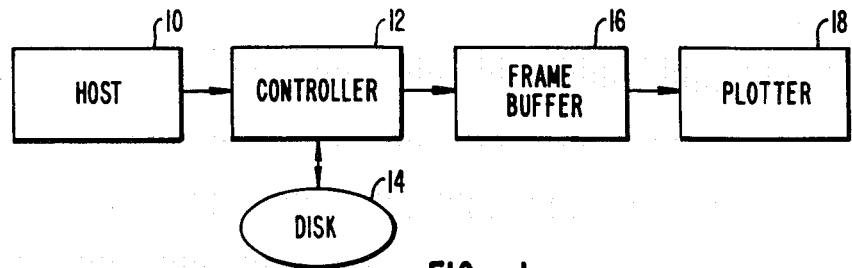
FIG._1. (PRIOR ART)
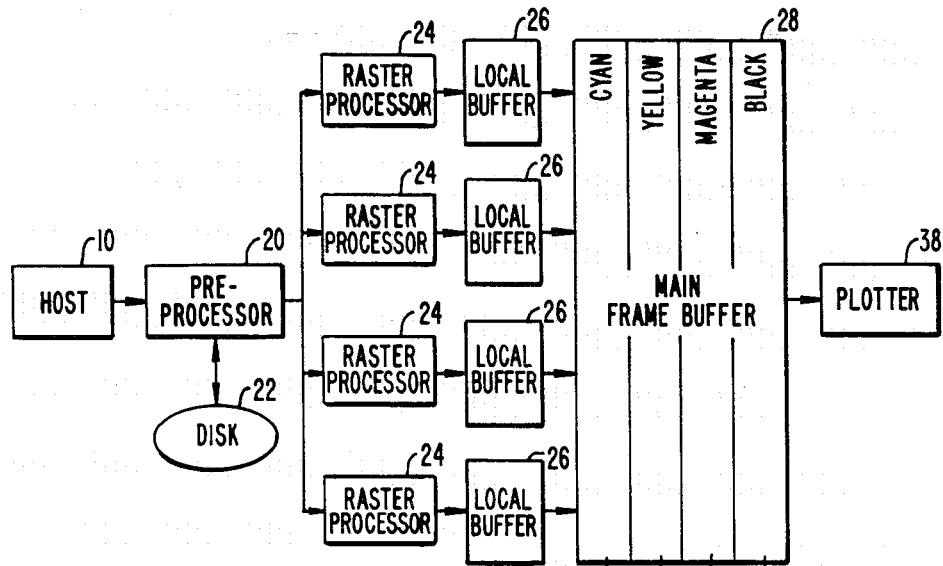
FIG._2.
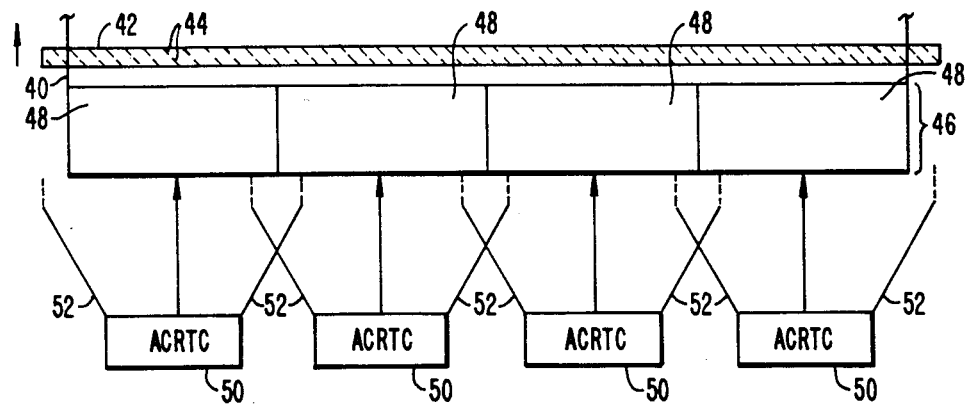
FIG._3.

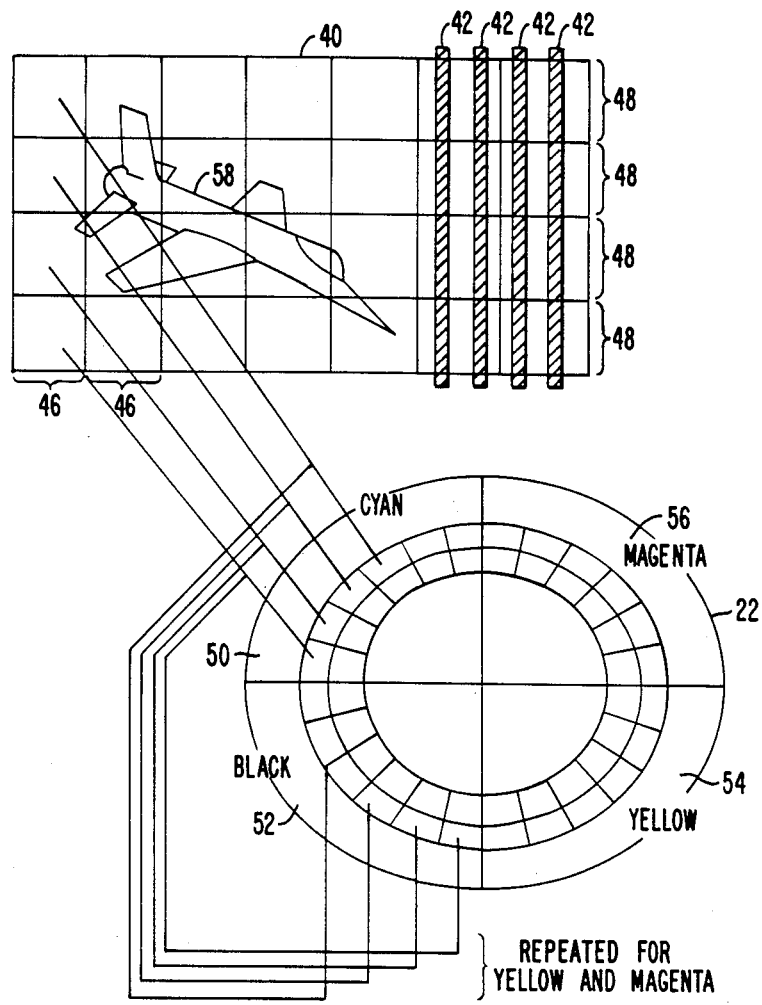
FIG._4.
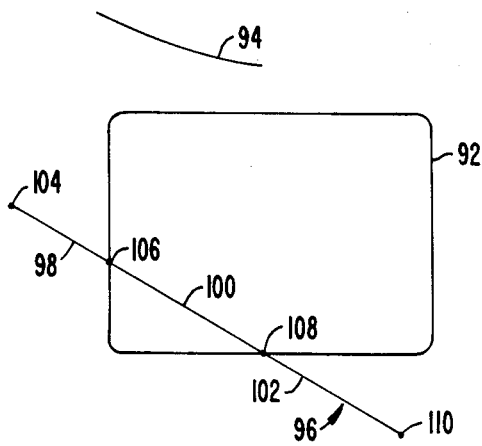
FIG._10.

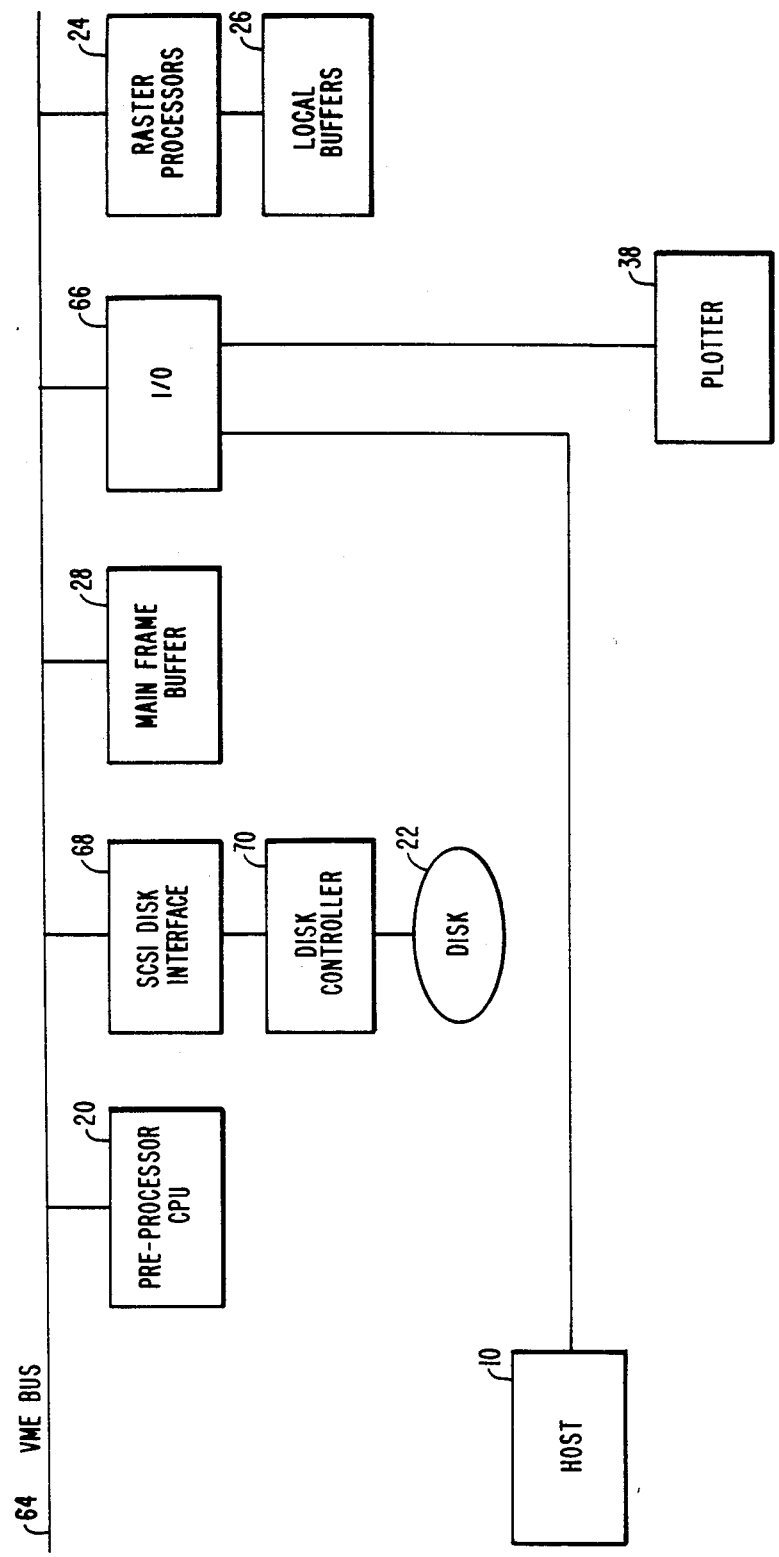
FIG._5.

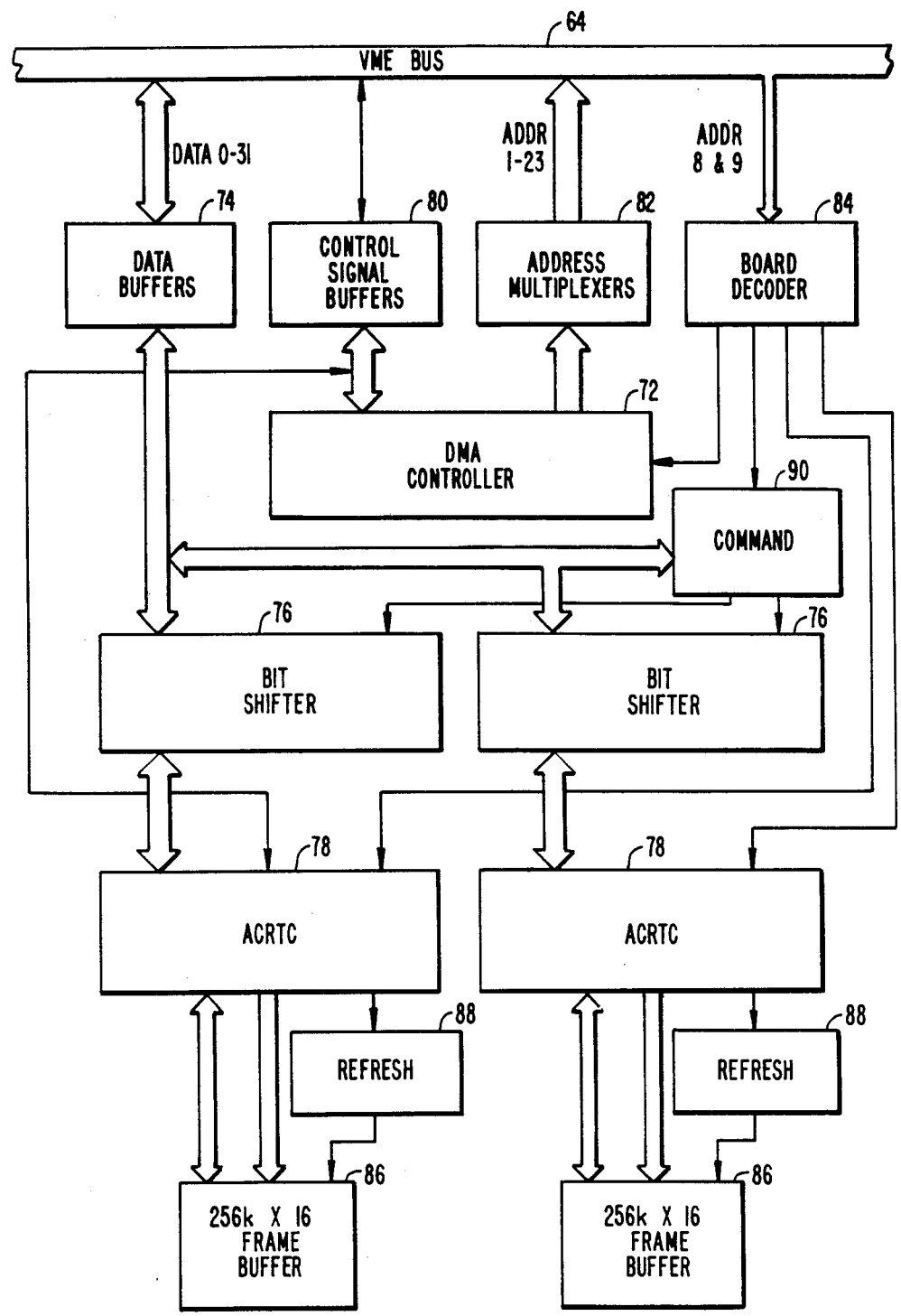
FIG._6.

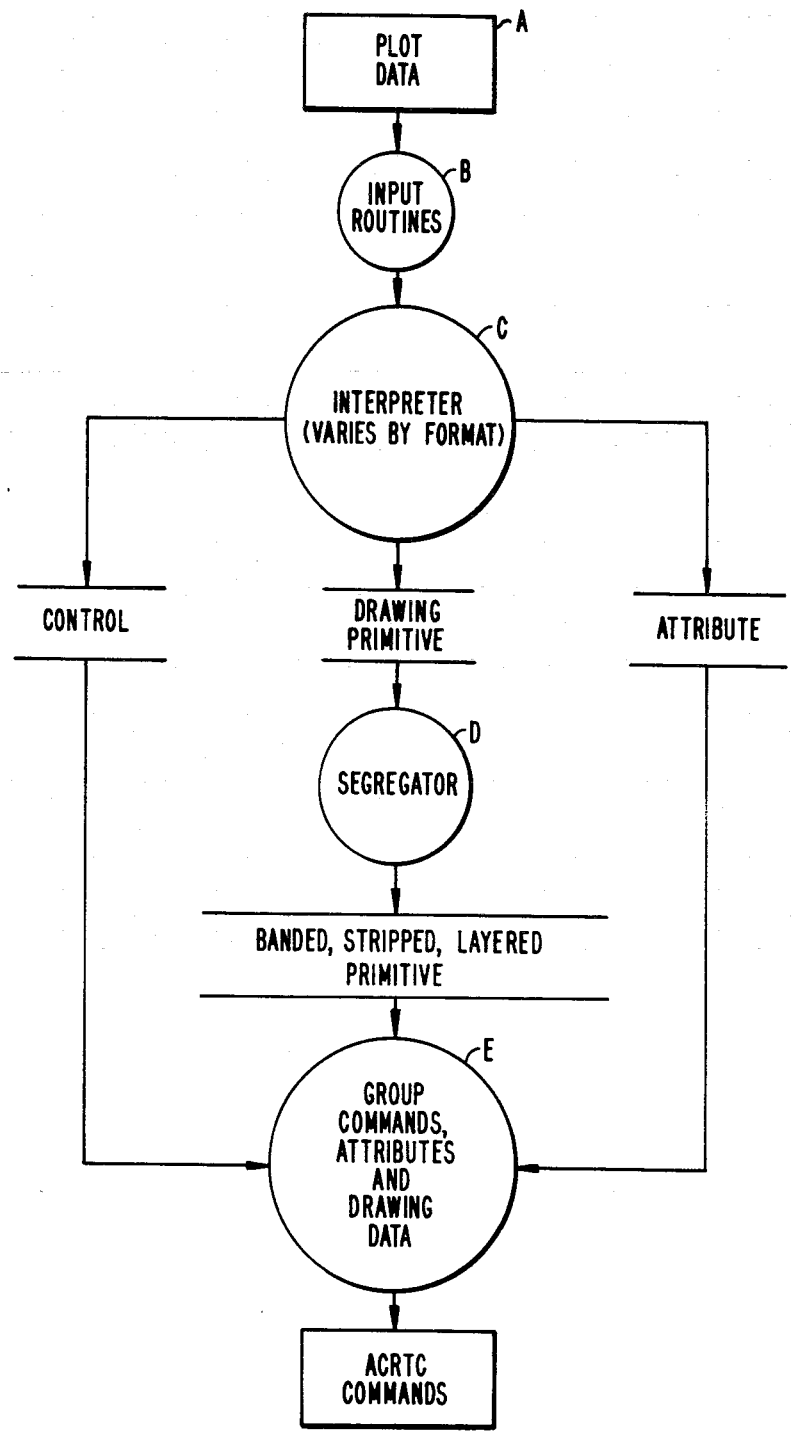
FIG.—7.

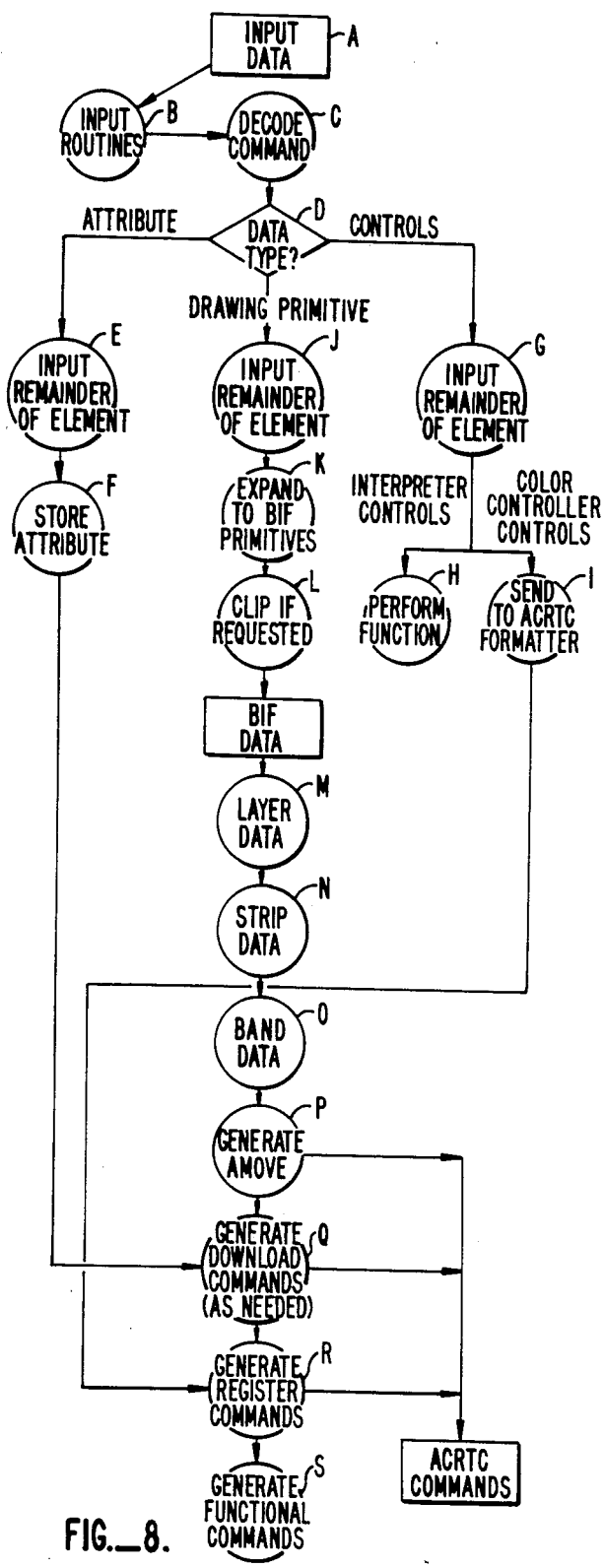
FIG._8.

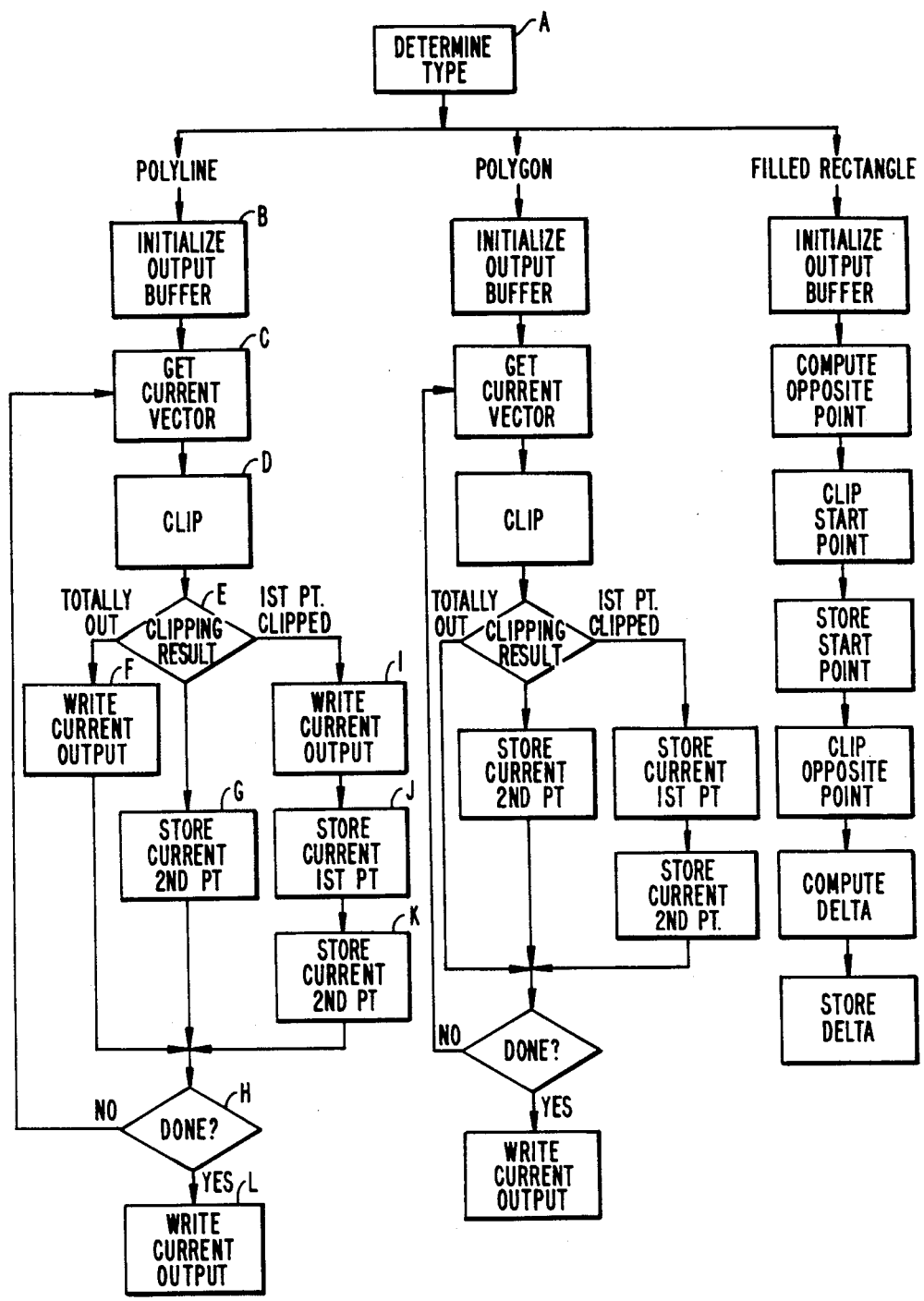
FIG._9.

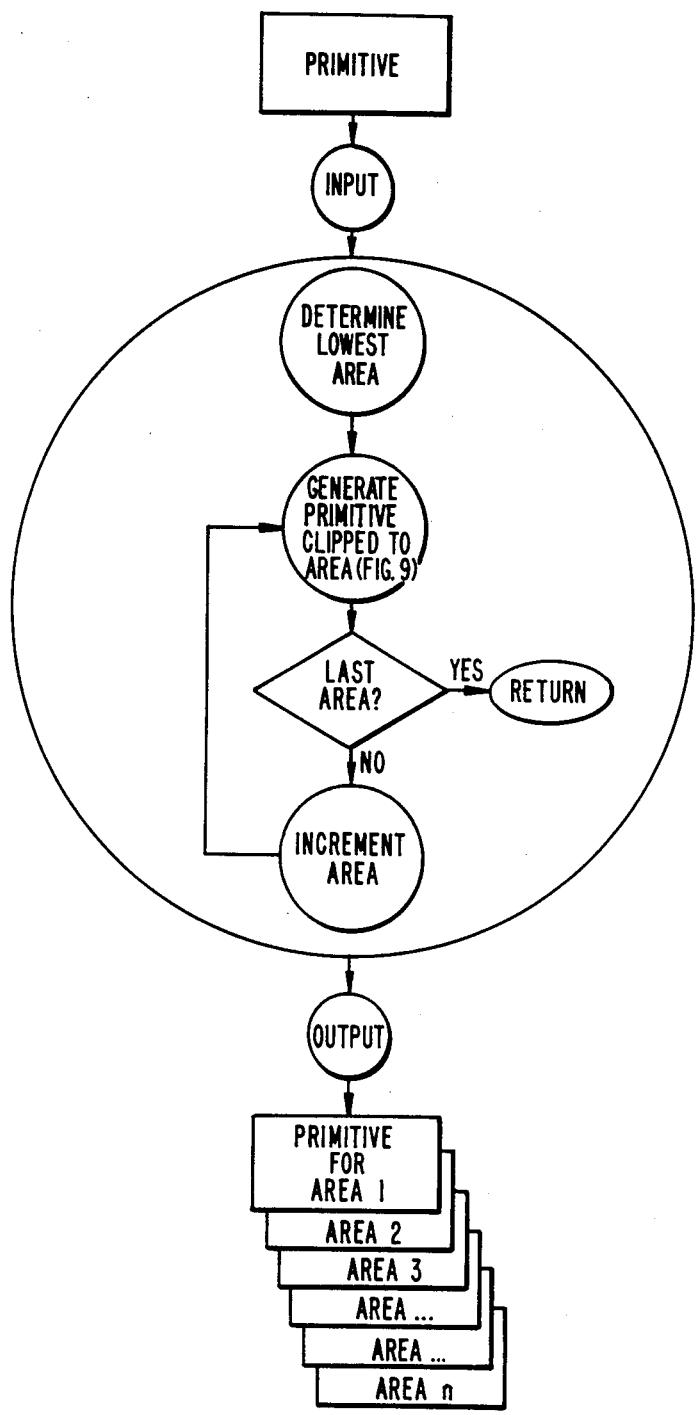
FIG.—11.

4,752,894

COLOR PLOTTER CONTROLLER

BACKGROUND OF THE INVENTION

The present invention relates to electrostatic plotters, and in particular to controllers for color electrostatic plotters.

In an electrostatic plotter, a paper passes by a head which has a large number of styli. Each stylus corresponds to a pixel to be placed on the paper as it passes by. Thousands of styli can be on a single head. Different combinations of styli are activated at each location so that an electrostatic charge is placed on the paper at each position activated. The paper then passes over toner which will adhere to pixels at which an electrostatic charge has been placed, thereby forming a picture. Color pictures can be produced by using several different toners corresponding to the different colors and making several passes across a single head or a single pass over several heads. A controller for the plotter must tell the plotter for each particular stylus whether it is to be activated or not.

The data which is presented to the plotter controller from a host computer or other input is typically in the form of graphic data descriptions. Such graphic data descriptions describe shapes on the picture to be printed, such as lines, arcs, polygons, ellipses, etc. Unusual shapes can be specified by specifying the edge of the area and what color the areas is to be filled with, for instance. The plotter controller must take this graphic data and transform it into raster data. The raster data is simply an on/off bit for each of the pixels in the picture.

Another device which uses raster data is a cathode ray tube (CRT) which is used in television sets, computer terminals, etc. The CRT has a large array of pixels formed by dots of phosphor on the screen. The raster data instructs the electron gun which is firing at the phosphor whether it is to be on or off at each particular pixel location. If the gun is on, it will cause the phosphor to emit light when it is impacted with electrons, otherwise, if the phosphor is not impacted, no light would be emitted. Color can be produced by arranging several phosphor dots at each pixel location with different types of phosphor corresponding to different colors. Alternately, the energy of the electron beam could be varied to produce color or gray scale variations. Thus, in addition to the on/off bit for each pixel, one or more bits must specify the color to be produced at each pixel and/or the intensity of each pixel.

The CRT, like the plotter, must scan the pixels line by line to produce the image. Thus, the controller must take graphical descriptions of data and convert it into raster data and feed it into the CRT or plotter in increasing values of x. The raster data must be repeatedly fed to a CRT to refresh a screen, otherwise the image would disappear. Accordingly, speed is very important for a CRT controller, and special purpose dedicated controllers on a single integrated circuit chip have been designed to provide this function. Advanced CRT controllers (ACRTC) have been integrated on a single chip to perform the functions of converting graphic data descriptions into raster data as well as controlling the display and refreshing of the CRT.

An example of a control system for a plotter is shown in FIG. 1. A host computer 10 produces graphic data descriptions which it supplies to a controller 12. Controller 12 then converts the graphic data into raster data and stores it on a disk 14. Data from disk 14 is supplied by controller 12 to a frame buffer 16 which has a fast access memory. Plotter 18 is then supplied data from buffer 16 at a fast speed as it is needed.

Because the market for plotters is not as large as the market for CRTs, fast integrated controllers for plotters corresponding to the ACRTC chip for CRTs are not presently commercially available. However, it is desirable to increase the speed of electrostatic plotters, especially where several colors are used, thus requiring additional time for each of the colors to be printed.

SUMMARY OF THE INVENTION

The present invention is an improved method and apparatus for controlling an electrostatic plotter which results in an increased speed for the plotter. This speed is achieved by dividing the picture to be printed into frames and processing the individual frames in parallel with separate controllers for each frame. The styli on the electrostatic printer's head will accordingly be divided into the separate frames. The raster data produced by each of the controllers is combined to form the entire picture and is forwarded to the plotter.

Each separate controller is given minimum and maximum x and y coordinates for the raster output. Each controller then processes the portions of the input data and produces a raster data output only for a frame corresponding to the designated x and y coordinates. Alternately, a preprocessor intercepts the graphic data descriptions from the host and breaks them into graphic data descriptions for the individual controllers for the individual frames. In order to do this, graphic data descriptions which extend across a frame boundary must be rewritten as two graphic data descriptions, each wholly contained within a frame. Each controller thus receives graphic data descriptions which appear to be the complete picture.

The present invention can be implemented using commercially available ACRTC chips designed for CRTs and adapting the ACRTCs for use by a plotter. For a color plotter, the picture may be divided into four frames, with four ACRTCs being used, one for each frame. The preprocessor takes graphic data descriptions from a host and, under one alternative, breaks them into graphic data descriptions for each of the four frames. As reconstructed, the graphic data for each frame appears to the ACRTC to be a complete picture. These data descriptions are then stored on a disk in four separate sections with each separate section corresponding to a different color. The ACRTCs then process the data in parallel one color at a time. The data is stored in a local buffer for each of the ACRTCs as it is processed. When the ACRTC processing is completed, the data in the four frames is combined again and is supplied to a main buffer which is divided into four segments, one corresponding to each color.

After a first color is processed for a band of the picture corresponding to the width of the storage space in the main buffer, a second color is processed. After all four colors have been processed, the main buffer will be filled and the plotter can then draw out the raster data in the main buffer for printing. As data is depleted, the master controller and the ACRTCs will supply additional data to the main buffer. An ACRTC chip is conveniently used because it is commercially available on a single chip with the processing power necessary. However, the ACRTC is designed to control an entire screen by itself and thus modifications are necessary for its use according to the present invention.

As discussed above, the graphic data descriptions can be reformatted for each frame. In addition, the ACRTC customarily receives a color designation for each pixel as the pixel is processed. For the plotter, no color designation is used and instead the data is processed separately for each color and stored in a separate portion of a main buffer to be accessed as needed by the plotter. According to the present invention, the data is not only divided into frames, but is also divided into bands. This division into bands accommodates the memory limitations of the local buffers for each ACRTC.

For further understanding of the nature and advantages of this invention, reference should be made to the ensuing detailed description taken in conjunction with the accompanying drawings.

BRIEF DESCRIPTIONS OF THE DRAWINGS

FIG. 1 is a block diagram of a prior art plotter control system;

FIG. 2 is a block diagram of a color plotter controller according to the present invention;

FIG. 3 is a schematic diagram of the division of the picture into frames;

FIG. 4 is a schematic diagram of the arrangement of frames and colors on a disk;

FIG. 5 is a more detailed block diagram of the embodiment of FIG. 2;

FIG. 6 is a block diagram of the raster processor of FIG. 4;

FIG. 7 is a generalized data flow diagram for a controller according to the present invention;

FIG. 8 is a more detailed version of the data flow diagram of FIG. 7;

FIG. 9 is a flow chart of a clipping routine according to the present invention;

FIG. 10 is a schematic representation of the clipping of a graphic element; and

FIG. 11 is a flow chart for the segregating of graphic data into bands and strips.

DETAILED DESCRIPTION OF THE PREFERRED EMBODIMENTS

FIG. 2 is a schematic block diagram of a controller configuration according to the present invention. A host computer 10 supplies graphic data to a preprocessor 20. Preprocessor 20 separates the data by frame, band and color and stores it on a disk 22. The bands correspond to vertical divisions along the paper to be printed on and the frames correspond to horizontal divisions. Data from disk 22 is separately supplied for each band and color to four raster processors 24. Each raster processor 24 processes a different frame of the data. Each raster processor includes an ACRTC chip and other circuitry as discussed below with reference to FIG. 4. As the data is processed, it is stored in local frame buffers 26 and is then combined in a main frame buffer 28. Depending upon which color is being processed, the data is supplied to one of segments 30, 32, 34 or 36 in main frame buffer 28 corresponding to the colors cyan, yellow, magenta and black, respectively. Plotter 38 then accesses the data in main frame buffer 28 as needed.

FIG. 3 shows the division of a paper into frames. A paper 40 is shown passing under a first head 42 having a number of styli 44 for applying electrostatic charge to the paper so that pixels will be formed when the paper passes a toner bath. A band 46 of paper 40 is shown divided into four frames 48. Each frame 48 corresponds to a different ACRTC 50. The maximum amount of a band that a particular ACRTC has the capacity to cover is indicated by lines 52. Thus, the size of the frames can be varied from one ACRTC to another so that one ACRTC may have a smaller frame than other ACRTCs.

FIG. 4 schematically shows how each frame is stored on a disk 22. Paper 40 is divided into a series of bands 46 and a series of frames 48. Each frame 48 for a particular band 46 is stored in the same position in each of four segments 50, 52, 54 and 56 on disk 22. Segments 50-56 correspond to the four colors cyan, black, yellow and magenta. Thus, four separate images are stored on disk 22, with a separate image for each color. As can be seen, an image 58 will extend across more than one frame 46 and more than one band 48.

The graphic descriptions of image 58 can be a combination of polygons, arcs, areas, etc. These graphic data descriptions must be split into appropriate frames 48 and bands 46. Prior art processes also split an image into a smaller piece when a window of a portion of a picture is printed or displayed. This is commonly done, however, by specifying the coordinates of the data after it has been converted into raster data and thus consists of a series of on or off bits for the pixels. In the present invention, the graphic data descriptions themselves are divided.

Thus, for instance, a circle which may be specified by a radius and an origin point may cross a frame or band border and will thus have to be divided into one or more arcs, each having a radius and start and end points. Thus, each frame for a particular band will end up with graphic data descriptions which are wholly contained within the frame. This allows each raster processor 24 as shown in FIG. 2 to separately process a frame in parallel, thus enhancing the speed of the controller.

The plotter has four (4) heads 42 as shown in FIG. 4, with each head 42 corresponding to a different color. Each head draws its raster data from a different one of segments 30-36 of main frame buffer 28.

In operation, referring to FIG. 2, preprocessor 20 receives graphic data descriptions from host 10. Preprocessor 20 then divides the data according to frame, band and color and stores the graphic data in segments 50-56 of disk 22. Graphic data descriptions which cross more than one frame or band are converted into two or more graphic data descriptions, with each description being wholly contained within a single frame and band. The four frames for the first band for a first color are supplied to raster processors 24. Alternately, all of the data can be supplied to each raster processor 24 with each raster processor having designated minimum and maximum x-y coordinates for its raster data. Each raster processor then processes the graphic data corresponding to those designated coordinates.

The graphic data is then converted into raster data, stored in local buffers 26, and then supplied to one of segments 30-36 of main frame buffer 28. The process is then repeated for the appropriate band for each of the four colors. When main frame buffer 28 is full, plotter 38 will begin pulling data as is needed by heads 42. As data is depleted in each of the segments 30-36 of main frame buffer 28, data from the next band is pulled from the disk 22 by controller 28 and supplied through raster processors 24 for processing to refill the particular segment.

If the data should be particularly dense in a particular frame, it will take longer for the raster processor 24 assigned to that frame to process the data. This could result in the plotter having to slow down to wait for the data, thus resulting in one region of the paper being printed with the paper moving slower. This slow movement can result in the white areas being in the toner longer, causing smudging, and for the color to be in the toner longer, thus causing unevenness in the darkness of the color across the paper. This effect can be compensated for by adjusting the frame width of the particular ACRTC for the region which is denser. Thus, for example, if the total number of bits for the four frames was 8.6 k, each ACRTC would normally process data to produce 2.15 k. However, if the data is denser in the center of the paper, the middle two ACRTCs could have their frame widths reallocated to 0.8 k, for instance, with the two outside ACRTCs being reallocated to 3.8 k. Thus, the speed of operation of the ACRTCs is evened when there is denser data in the 0.8 k regions than in the 3.5 k regions.

Alternately, rather than altering the frame width, the maximum data denseness of the frames stored on disk 22 can be determined as they are stored by controller 20. The speed of the plotter can then be slowed so that it can handle all data at the slowest speed required for this maximum density data.

FIG. 5 shows a generalized block diagram of the control system of FIG. 2. A host computer 10 is coupled to a VME bus 64 through an input/output (I/O) board 66. The VME bus is a universal standard bus type. I/O board 66 handles the necessary handshakes between host 10 and controller 20. An SCSI disk interface 68 and a disk controller 70 handle reading and writing data to disk 22. Four raster processors 24 and their local buffers 26 are also coupled to VME bus 64 as well as main frame buffer 28 and plotter 38 through I/O board 66.

In operation, data from host 10 is handled by I/O board 66 and then transferred via bus 64 to preprocessing CPU 20. CPU 20 then frames, bands and segregates by color the graphic data. In addition, CPU 20 modifies data descriptions for graphic data extending across one more frame or buffer as discussed above. CPU 20 also handles converting the graphic data into the form needed by the ACRTC. For instance, the graphic data may be in the form of one standard which is different from the form the ACRTC is designed for. After CPU 20 has performed these operations, the data is stored through SCSI disk interface 68 and disk controller 70 onto disk 22. After all the data is processed, it is read from disk 22 into main memory 28 and then supplied to raster processors 24 through VME bus 64 under the control of CPU 20. The processed data from each raster processor 24 is loaded into a local frame buffer 26 until the processing is completed. The data is then transferred via VME bus 64 to main frame buffer 28 where it can be accessed by plotter 38.

FIG. 6 is a block diagram showing in more detail a board containing two ACRTCs 24. A direct memory access (DMA) controller 72 handles the transfer of data on and off the board. Data is supplied in the form of graphic data descriptions from VME bus 64 through data buffers 74, and a bit shifter 76 to ACRTCs 78. Control signals from VME bus 64 pass through a control signal buffer 80 to DMA controller 72 and ACRTCs 78. A board decoder 84 provides enable-type signals to the various circuits. As data is processed by ACRTCs 78, it is stored in 256 k by 16 bit frame buffers 86. The contents of frame buffers 86 are refreshed by refresh circuitry 88.

After an entire frame has been processed and stored in the frame buffers 86 as raster data, the data is then transferred through ACRTC 78, bit shifter 76, and data buffer 74 to VME bus 64 to be stored in main frame buffer 28 as shown in FIG. 5. DMA controller 72 provides addresses through address multiplexer 82 directing the portion of main frame buffer 28 to which the raster data is to be deposited.

A normal direct memory access (DMA) from local frame buffers 86 to main frame buffer 28 would produce contiguously packed data. In order to restructure the original image from the individual frames, the data must be packed in strips for each frame. Thus, if the image has a total width of 8960 pixels and is divided into four equal frames, each frame will be assigned a strip 2240 pixels wide. Thus, the normal DMA transfer is modified so that the first frame starts on line 1 and writes into locations 0–2239, then skips to the second line and writes into location 8960−(8960+2240), then skips to line 3, etc. The second frame is written into line 1, location 2240−(2240+2240) then skips to line 2, etc. The same process is repeated for each color with a different initial address corresponding to the various segments as shown in FIG. 2.

Bit shifter 76 can either simply pass through data or perform bit shifting in accordance with commands from a command circuit 90. Bit shifting is used to accommodate using two bits for each pixel in the ACRTC. This two bit configuration is used to accommodate the situation where two overlapping areas are to be filled with a color. For instance, a shape may be specified as a combination of a circle and a rectangle which overlap. The ACRTC chip is designed to fill an area by starting at a point in the interior of the area and proceeding in both directions setting bits to the color until an edge is encountered. The ACRTC can tell if an edge is encountered because the edge is first defined as a separate color. This causes problems when two overlapping areas are attempted to be filled with the edge of one area being interior to a second area. The ACRTC will stop filling when it encounters the edge of the overlapping area, thus leaving an unfilled space.

This problem is overcome by using two bits for each pixel, with one two-bit combination being used for the pixels in the area to be filled and the other two-bit combination being used for the pixels defining the edge. The ACRTC chip sees each two-bit combination as designating a different color. However, the bits can be thought of as one bit representing the interior color or the edge color and the other bit indicating whether the pixel should be on or off. The ACRTC then processes the data, producing two bits of raster data for each pixel. After the processed raster data is output from the ACRTC, the bit shifter strips off the color bit from each two-bit color combination, leaving simply an on/off bit for the particular color being processed at that time. Thus, the ACRTC is fooled into processing the area for two colors and then the extra bit is removed, resulting in only the on/off bit. The data is then repacked to produce a contiguous series of on/off bits for the pixels. The data is then output through data buffer 74 and VME bus 64 in the same manner as other raster data.

Another problem with the area fill routine of the ACRTC when used in the present invention is that the ACRTC will fill only up to the edge specified. The problem arises when an area extends across more than one frame and must be divided. When the area is filled in the particular frames and the frames are combined, the frame borders will appear in the picture. This problem is solved by telling the ACRTC that the frame is slightly larger than it actually is so that the ACRTC will fill past the edges of the frame buffer so that the edge of the area is outside the real frame buffer edges. Thus, the edges can be stripped away when the areas are combined to result in a contiguously filled area.

FIG. 7 shows a generalized data flow diagram according to the present invention. Plot data (A) from a host computer is processed through required input routines (B). The data is then interpreted (C) to determine whether it is control data, a drawing primitive, or an attribute. Primitives are graphic data such as points, lines, polygons or character strings. Attributes include such things as color, line style or thickness, or half-tone colors. Half-tone colors are the combination of two or more colors among alternating pixels in order to produce an overall impression of a third color when viewed from a distance.

The drawing primitives are then segregated (D) into individual bands, frames (horizontal strips along the paper) and colors (layers). The control data, the banded, stripped, and layered primitives and the attributes are then combined to generate the various ACRTC commands (E).

FIG. 8 shows the data flow diagram of FIG. 7 in more detail. Input data (A) is supplied through input routines (B) and is then decoded (C). The first portion of each command element designates whether the data is an attribute, a drawing primitive, or a control signal (D). For attribute commands, the remainder of the element is input (E) and then stored (F) for later use. For the control signals, the remainder of an element is input (G) and determined to be either a color controller signal or an interpreter control signal. If it is an interpreter control signal, the function specified is performed (H). The color controller control signals are sent to an ACRTC format function specified later in the data flow diagram (I).

For the drawing primitives, the remainder of the command element is input (J) and is transformed into the data standard being used (K). The present invention could use, for instance, the Benson internal format (BIF).

If only a window of the picture is to be plotted, the present invention allows the data to be clipped to produce this window (L) prior to it being supplied to the ACRTC chips. The resulting data is then divided into data for the individual colors or layers and (M), data for the particular frames or strips (N) and data for the particular bands (O).

The layered, stripped and banded data is then formatted in accordance with the format the ACRTC is designed to accept. The first formatting command tells the ACRTC to begin at the beginning of a particular graphic element (P). Download commands are generated as needed (Q). Download commands are specifications which are used later by the ACRTC, such as specifying the combination of colors used to produce a particular half-tone which will be later used to fill a specified area. Register commands are also generated (R). These commands basically provide pointers to the downloaded commands referred to above.

Finally, functional commands (S) are generated which specify the transferring of data and a particular graphic drawing to be executed, (i.e., line, polygon, arc, etc.) The functions and use of such commands are set forth in the data books for the ACRTC chips themselves. Preferably, the HD63484 ACRTC from Hitachi would be used. The Hitachi User's Manual specifies the various commands and their use.

FIG. 9 is a flow chart specifying how primitives may be clipped according to the present invention. As discussed above, this clipping is done when a particular graphic description extends across one or more frames or bands. As also discussed earlier, an alternative to clipping is to supply all the graphic data to each ACRTC and allow the ACRTC to process the portion of the data which corresponds to its assigned coordinates.

If clipping is done, the type of graphic description is first determined (A). If the graphic description is a polyline (a combination of a number of lines) the output buffer is first initialized (B). The current vector description of the line is then obtained (C). The vector is clipped (D) where it crosses a frame or band boundary. The clipping result is then analyzed (E).

This analysis can best be understood with reference to FIG. 10. FIG. 10 shows a frame 92 and two lines 94, 96. Line 94 is completely outside of frame 92 and thus, when analyzed, would be determined to be totally outside frame 92. The current output buffer contents, which have been initialized to O, would then be written (F).

The second line 96 is divided into three segments 98, 100 and 102. The first segment 98 between points 104 and 106 is examined. The result of the examination is other than it being totally outside of the frame or first point 104 being clipped. Thus, the current second point 106 is stored (G). The analysis is not completed (H) so the next vector is then obtained (C) and clipped (D). This results in segment 100 becoming the current vector. Second point 106 of segment 98 becomes the first point of segment 100. The first point 106 is determined to be clipped, so the current output, i.e., segment 100, is written (I) with first point 106 and second point 108 being stored (J, K). The line has not yet been completely analyzed (H) so vector 102 becomes the current vector (C) with point 108 being the first point and point 110 being the second point. This vector is determined to be outside of the frame and is thus not used. The line is now completely analyzed (H) and the current output from step (I) is then written (L).

As shown in the flow chart of FIG. 9, a polygon and a filled rectangle are analyzed in a similar manner to produce a graphic data description wholly contained in frame 92.

FIG. 11 shows the process for dividing the graphic data into areas corresponding to a particular band or frame. As each primitive (A) is input (B), the areas are examined in sequence, starting with a first area (C). The process of FIG. 9 is executed for that primitive for the area selected (D). If more areas remain (E), they are examined as well (F). The output (G) will be a series of separate primitives, with each area into which the original primitive extended having its own primitive.

As will be understood by those familiar with the art, the present invention can be embodied in other forms without departing from the spirit or essential characteristics thereof. For example, more or less than four ACRTC controllers may be used or the main frame buffer could be expanded so that the width of the band is increased or banding is not required. Accordingly, the foregoing embodiments are intended to be illustrative of, but not limiting of, the scope of the invention which is set forth in the following claims.

What is claimed is:

1. A method for converting graphic data description for an image to be printed in an electrostatic plotter into raster data for said plotter, comprising:
   (a) dividing said image into at least two frames;
   (b) supplying a separate processor for each of said frames;
   (c) designating different minimum and maximum x and y coordinates for raster data for said frames for each of said processors, such that a total of the x and y coordinates covered by said frames equals the x and y coordinates for said image;
   (d) separately converting said graphic data descriptions for each said frame into raster data for each said frame with said processors; and
   (e) sequentially providing said raster data for said frames to said plotter.

2. The method of claim 1 wherein said image is divided into four frames.

3. The method of claim 2 further comprising repeating steps (a)–(e) for graphic data descriptions for each of four colors.

4. A method for converting graphic data descriptions for an image to be printed in an electrostatic plotter into raster data for said plotter, comprising:
   (a) dividing said image into at least two frames;
   (b) separating said graphic data descriptions into groups corresponding to each of said frames;
   (c) converting graphic data descriptions extending across more than one frame into graphic data descriptions wholly contained in a single frame;
   (d) separately converting said graphic data descriptions for each said frame into raster data for each said frame; and
   (e) sequentially providing said raster data for said frames to said plotter.

5. The method of claim 4 wherein said image is divided into four frames.

6. The method of claim 5 further comprising repeating steps (a)–(e) for graphic data descriptions for each of four colors.

7. The method of claim 4 wherein said converting step comprises:
   specifying new end points for lines;
   converting polygons into a series of lines; and
   converting ellipses and circles into arcs.

8. The method of claim 7 further comprising filling specified areas with a color, said filling step including, for polygons extending across a frame border, defining an edge immediately outside a portion of said frame buffer border across which said area extends, said edge having a color different from said filling color, so that said area can be filled on each line of said area until said different color is encountered.

9. The method of claim 8 further comprising, for overlapping areas of the same color,
   specifying two bits for each pixel of an area and each pixel of an edge for said area;
   storing a first two-bit pattern for each pixel of said edge;
   filling an area bounded by said edge with a second two-bit pattern having one bit identical to one bit of said first two-bit pattern;
   deleting, for each pixel of said edge and area, the bit other than said identical bit; and
   packing said identical bits so that each pixel is represented by a single bit.

10. The method of claim 4 wherein said frames are divided so that a border between said frames is perpendicular to a head in said electrostatic plotter and further comprising:
    dividing said image into at least two bands such that a border between said bands is parallel to said head in said electrostatic printer;
    separating said graphic data descriptions into groups corresponding to each of said bands; and
    converting graphic data descriptions extending across more than one band into graphic data descriptions wholly contained in a single band.

11. The method of claim 10 further comprising dividing said graphic data descriptions into graphic data descriptions for each of four colors.

12. The method of claim 11 wherein said colors are black, magenta, cyan and yellow.

13. The method of claim 12 further comprising storing said framed and banded graphic data descriptions in a memory, with each frame and band being stored in an identical position on each of four sectors of said memory corresponding to said four colors.

14. The method of claim 13 wherein said memory is a disk.

15. The method of claim 13 further comprising storing said raster data in a buffer, said buffer having four separate regions corresponding to said four colors, each of said regions having a capacity for one of said bands.

16. The method of claim 4 further comprising varying the width of said frames in accordance with the data content of said image so that a frame with a denser data content has a smaller width.

17. A method for converting graphic data descriptions for an image to be printed in an electrostatic plotter into raster data for said plotter, comprising:
    dividing said image into at least two frames;
    separating said graphic data descriptions into groups corresponding to each of said frames;
    converting graphic data descriptions extending across more than one frame into graphic data descriptions wholly contained in a single frame;
    storing said separated and converted graphic data descriptions on a disk;
    providing said data on said disk for each frame to a separate advanced cathode ray tube controller;
    separately converting said graphic data descriptions with said controllers for each said frame into raster data for each said frame; and
    sequentially providing said raster data for said frames to said plotter.

18. A method for converting graphic data descriptions for an image to be printed in an electrostatic plotter into raster data for said plotter, comprising:
    dividing said image into four frames so that a border between said frames is perpendicular to a head in said electrostatic plotter;
    separating said graphic data descriptions into groups corresponding to each of said frames;
    converting graphic data descriptions extending across more than one frame into graphic data descriptions wholly contained in a single frame;
    dividing said image into at least two bands such that a border between said bands is parallel to said head in said electrostatic printer;
    separating said graphic data descriptions into groups corresponding to each of said bands;

converting graphic data descriptions extending across more than one band into graphic data descriptions wholly contained in a single band;

dividing said graphic data descriptions into graphic data descriptions for each of four colors;

storing said framed and banded graphic data descriptions on a disk, with each frame and band being stored in an identical position on each of four sectors of said disk corresponding to said four colors;

using four separate controllers to separately convert said graphic data descriptions for each said frame, band and color into raster data for each said frame, band and color;

combining said raster data for each said frame, band and color to produce raster data for said image, and storing said raster data in a buffer, said buffer having four separate regions corresponding to said four colors, each of said regions having a capacity for one of said bands.

19. An apparatus for converting graphic data descriptions for an image to be printed in an electrostatic plotter into raster data for said plotter, comprising:

a preprocessor adapted to receive said graphic data and provide to an output portions of said graphic data, each portion corresponding to one of a plurality of frames covering separate portions of said image;

first memory means for storing said graphic data;

a plurality of raster processors corresponding to said plurality of frames, each said raster processor being adapted to receive said graphic data and convert said graphic data into raster data for one of said frames; and second memory means for storing said raster data for all of said frames.

20. The apparatus of claim 19 wherein said first memory means is a disk.

21. The apparatus of claim 20 wherein said preprocessor is further adapted to separate said graphic data by color and to store said graphic data on separate segments of said disk, each segment corresponding to a different color.

22. An apparatus for converting graphic data descriptions for an image to be printed in an electrostatic plotter into raster data for said plotter, comprising:

a preprocessor adapted to receive said graphic data, separate said graphic data into a plurality of frames, each frame being a portion of said image, and convert graphic data extending across more than one frame into converted graphic data descriptions wholly contained in a single frame;

first memory means for storing said separated and converted graphic data;

a plurality of raster processors corresponding to said plurality of frames, each said raster processor being adapted to receive said separated and converted graphic data for a frame and convert said separated and converted graphic data into raster data for said frame; and second memory means for storing said raster data for all of said frames.

23. The apparatus of claim 22 wherein said first memory means is a disk.

24. The apparatus of claim 23 wherein said preprocessor is further adapted to separate said graphic data by color and to store said graphic data on separate segments of said disk, each segment corresponding to a different color.

25. The apparatus of claim 22 wherein said raster processors comprise advanced cathode ray tube controllers (ACRTCs).

26. The apparatus of claim 22 further comprising a plurality of third memory means, each third memory means being coupled to one of said raster processors, for storing said raster data for a single frame as said raster data is being produced by one of said raster processors.

27. The apparatus of claim 22 further comprising a DMA controller adapted to supply said separated and converted graphic data to said raster processors.

28. The apparatus of claim 27 wherein said raster processors include cathode ray tube controllers (CRTCs) and further comprising mean for eliminating a first bit from each of a plurality of two-bit combinations corresponding to pixels output from said CRTCs and shifting the remaining bits to produce a contiguous group of bits.

29. An apparatus for converting graphic data descriptions for an image to be printed on a paper in an electrostatic plotter into raster data for said plotter, comprising:

a preprocessor adapted to receive said graphic data, separate said graphic data into a plurality of frames corresponding to strips along said paper perpendicular to a head in said plotter, separate said graphic data into bands corresponding to bands along said paper parallel to said head, separate said graphic data according to color, and convert graphic data extending across more than one frame or band into converted graphic data wholly contained in a frame and band;

a disk for storing said separated and converted graphic data, said disk having a plurality of segments, each segment corresponding to one of said colors;

a plurality of cathode ray tube controllers (CRTCs) corresponding to said plurality of frames, each said CRTC being adapted to convert said separated and converted graphic data for a single frame into raster data for said frame;

a DMA controller for transferring data from said disk to said CRTCs;

a plurality of local frame buffers corresponding to said CRTCs for temporarily storing said raster data as it is produced by said CRTCs; and a main frame buffer for storing said raster data from all of said local frame buffers.

* * * * *